May 1, 1923.

W. J. W. BRUCE

DRAIN TRAP

Filed Dec. 30, 1920

1,453,743

Inventor:
William J. Willett Bruce,
By Dodge and Sons
Attorneys.

Patented May 1, 1923.

1,453,743

UNITED STATES PATENT OFFICE.

WILLIAM J. WILLETT BRUCE, OF CHESHIRE, ENGLAND.

DRAIN TRAP.

Application filed December 30, 1920. Serial No. 434,108.

(GRANTED UNDER THE PROVISIONS OF THE ACT OF MARCH 3, 1921, 41 STAT. L., 1313.)

*To all whom it may concern:*

Be it known that I, WILLIAM J. WILLETT BRUCE, a subject of the King of Great Britain, residing at Cheshire, England, have invented certain new and useful Improvements in Drain Traps (for which I have obtained a patent in Great Britain No. 138,880, filed Sept. 21, 1918, No. 15,358/18), of which the following is a specification.

This invention pertains to a combined drain trap and non-return valve and is designed more particularly for installation in the holds of vessels whereby any accumulated water is allowed to pass freely into the bilge below and at the same time preventing water, hot air or gases from passing up from the bilges into the hold of the vessel and damaging the cargo therein.

The invention is illustrated in the annexed drawings, wherein,—

Figure 1:
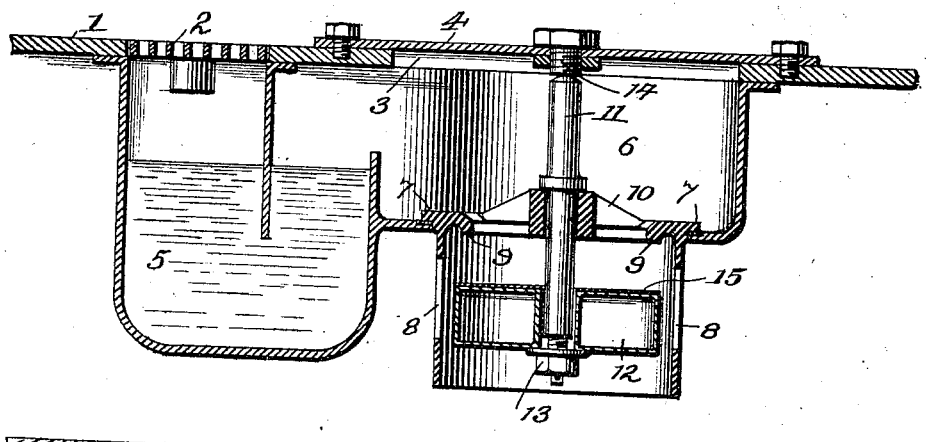

Fig. 1 is a vertical longitudinal section of the structure; and

Figure 2:
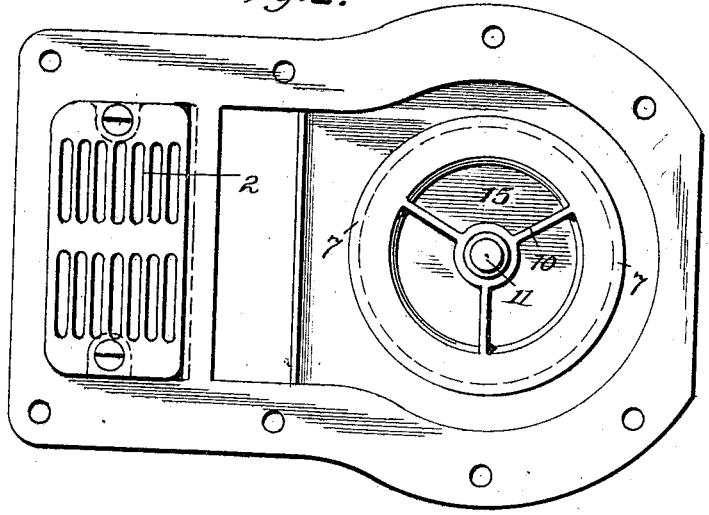

Fig. 2 a top plan view with the cover plate removed.

As above indicated, the main object of the invention is to provide a device whereby any accumulated water is allowed to pass freely into the bilge but preventing a reflow of any water, hot air or gases. Where the device is employed upon ships in which no frozen or chilled cargo is carried, the valve acts as a ventilator, permitting the free circulation of air and thus preventing dry rot which is usually found in portions of the wood type of insulation. The valve is also applicable to ordinary freighters where the cargo hold is fitted with a close ceiling.

The accumulation of water in the holds of vessels can not be indicated by the bilge sounding pipes or by trying out the bilges with the pumps and therefore often remains undiscovered until the vessel arrives at her port of discharge with the result that a certain portion of the cargo may be damaged.

In the drawing, 1 denotes the plates of the ship's structure, tank, &c., to which the drain trap is attached provided with an opening for the reception of a grating 2, preferably formed of non-corrodible metal, and with a second and larger opening 3 over which is secured a cover plate 4 likewise preferably formed of non-corrodible metal. Located below the level of the plating but and in line with the openings aforesaid, is a combined trap and valve mechanism. It may be said to comprise a chamber shell which at one end is provided with a trap 5, the upper end of which lies below the grating 2 and through which any water of condensation or the like may freely pass. To the right of the trap (in the structure shown) there is formed a chamber 6, which communicates with the lower open end of the trap 5, said chamber underlying the opening 3 and the cover plate 4. The lower wall of the chamber is provided with an opening, preferably cylindrical in form, and mounted within said opening is a combined valve and guard. Said member is inserted through the opening 3, the cover plate at that time, of course, being removed, and its outwardly extending shoulder 7 bears against the bottom wall of the main chamber or shell. It extends through and downwardly to a point below said wall and in addition to being open at its lower end is preferably provided with lateral openings 8. The valve seat is denoted by 9. The upper portion of said member is formed with a spider 10 having a central hub through which is passed a spindle 11, the shouldered portion of the spindle bearing upon the upper portion of the spider hub while the lower portion thereof or that part which is within the guard proper, forms the support for a float valve 12, preferably formed of copper and provided on its upper surface with a covering of leather or other suitable material 15. Said valve is prevented from slipping off the lower end of the spindle by a nut 13 and the central opening in the valve is such that it is free to move upon the spindle and to be forced upwards against the seat 9 and lower face of the spider hub upon the rise of water below the valve. Thus when the water rises to a point where it would run back through the trap the float valve cuts it off and absolutely precludes the passage of water therethrough.

In order to maintain the combined guard and valve seat element in position the closure plate 4 is provided with a set bolt 14 which when the parts are assembled bears directly upon the upper end of the spindle and forces the flange 7 into contact with the lower wall of the main chamber or shell. The trap will, of course, be sealed with water brine or other suitable liquid so that no gases or hot air may pass upwardly therethrough and through the grating 2 into the cargo or other spaces of the ship, or compartment, the valve 12, of course, not functioning to close the passage through the structure under the action of air or gas.

From the foregoing it will be readily appreciated that by merely removing the plate 4 and lifting the spindle 11 upwardly that the valve seat and guard together with the valve, may be withdrawn for the purpose of repair or cleaning. When the parts are replaced, firm contact may be had, as above noted, by merely screwing the set bolt 14 inwardly directly against the upper end of the spindle.

What is claimed is:

1. In a structure of the class described, the combination of a casing having a trap at one end, said trap at its lower end communicating with a normally unsealed chamber formed to one side thereof; a valve seat located in the lower portion of the chamber; and a float valve mounted below the seat for movement toward and from said seat.

2. In a structure of the class described, the combination of a casing having a trap at one end, said trap at its lower end being in communication with a normally unsealed chamber formed to one side thereof; a valve seat provided in the bottom portion of said chamber; a fixed stem extending downwardly below said seat; and a float valve mounted upon the stem below the seat and free to move toward and from said seat.

3. In a structure of the class described, the combination of a casing having a trap at one end, said trap at its lower end communicating with a normally unsealed chamber formed to one side thereof; a combined guard and valve seat mounted in an opening formed in the lower portion of the chamber; a spindle mounted in said guard member extending downwardly below the valve seat; a cylindrical shaped float valve mounted upon the spindle and free to move toward and from the seat; and means for securing the spindle and combined valve seat and guard in place.

4. In a structure of the class described, the combination of a casing having a trap at one end, said trap at its lower end communicating with a chamber formed to one side thereof; a grating overlying the upper end of the trap; a combined guard and valve seat mounted in an opening formed in the bottom wall of the chamber, the guard extending downwardly below the lower wall of said chamber, said guard being provided with a flange which overlaps the upper face of the bottom wall of the chamber and likewise having a spider extending inwardly from the valve seat; a spindle mounted in an opening formed in the spider, said spindle having a shoulder contacting the hub of the spider; a float valve mounted upon the lower depending portion of the spindle and housed by the guard, said float valve being free to move toward and from the seat on the spindle; a cover plate; and a set bolt secured in the plate in line with the upper end of the spindle whereby the spindle may be forced downwardly into contact with the spider and the combined seat and guard element forced to position with reference to the bottom wall of the chamber.

In testimony whereof I have signed my name to this specification.

WILLIAM J. WILLETT BRUCE.